April 18, 1944.                    J. J. BLACK                    2,346,900
              TURNTABLE MECHANISM FOR TRAILERS OR TRUCKS
                      Filed May 8, 1942            2 Sheets-Sheet 2
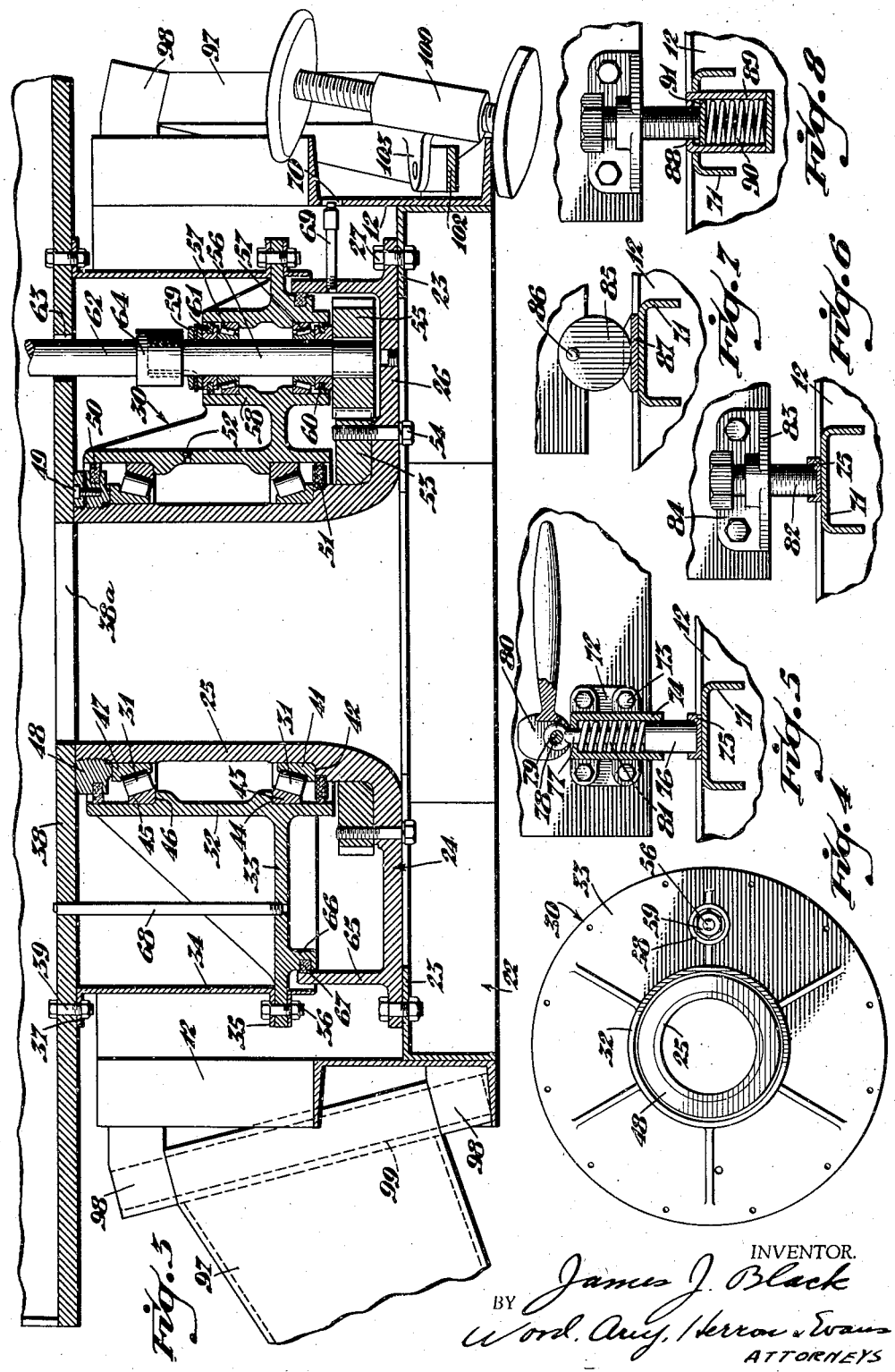
INVENTOR.
James J. Black
BY
Wood, Auy, Herron & Evans
                    ATTORNEYS Patented Apr. 18, 1944

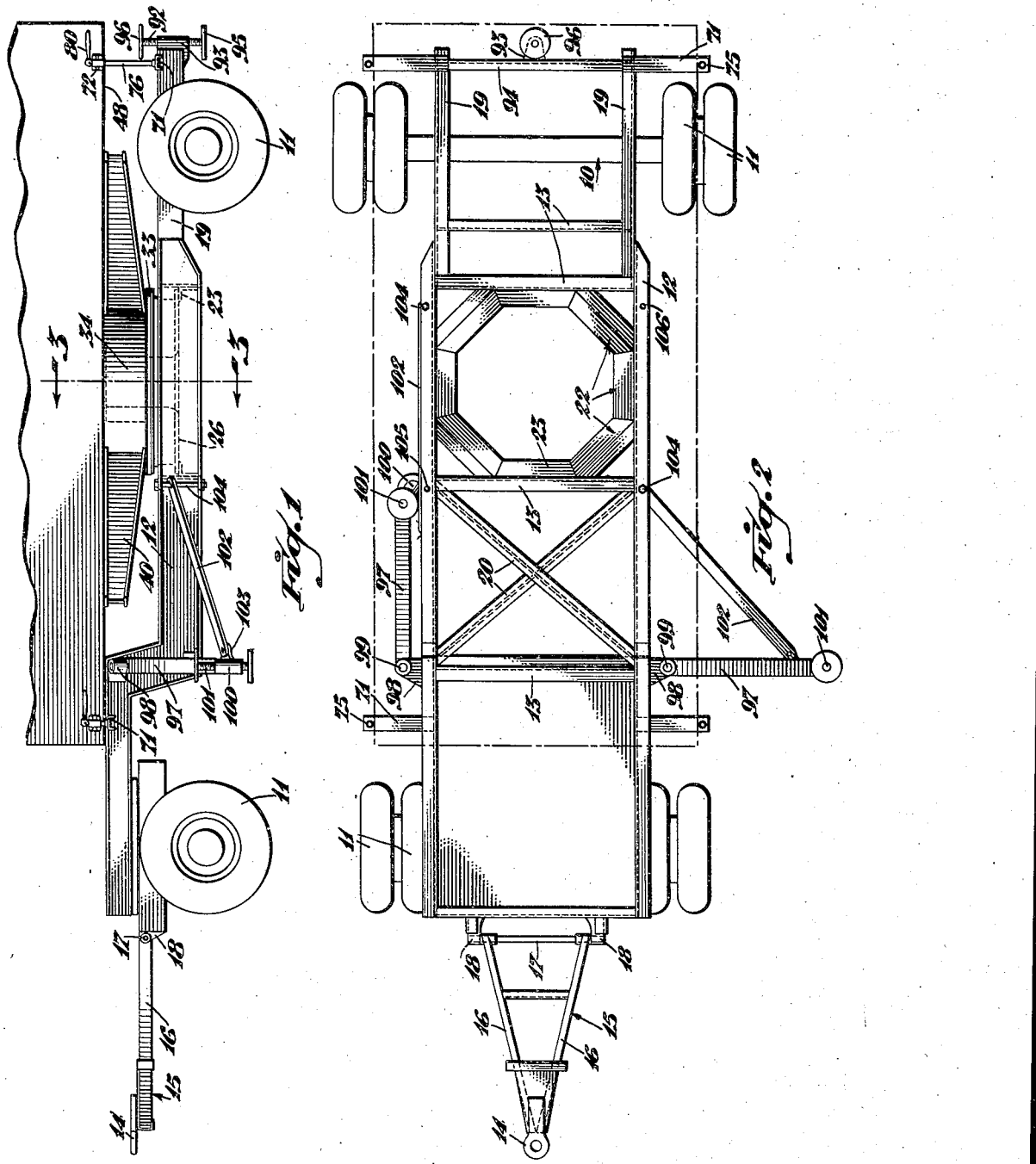

2,346,900

UNITED STATES PATENT OFFICE 2,346,900

TURNTABLE MECHANISM FOR TRAILERS OR TRUCKS

James J. Black, Cincinnati, Ohio, assignor to The Trailer Company of America, Cincinnati, Ohio, a corporation of Delaware Application May 8, 1942, Serial No. 442,201

6 Claims. (Cl. 280—6)

This invention relates to trailer or truck construction and is particularly directed to a trailer or truck incorporating a turntable mechanism for rotatably supporting a body or a unit of some sort which requires rotation. The type of unit or body which it is proposed to carry on the trailer or truck involves a great deal of weight. Therefore, mechanism must be provided which is capable of rotating a heavy body and moreover, the body must be mounted so as to permit relatively easy rotation. Also, since the body is to be transported on a trailer chassis, structure must be provided which will prevent tipping or undue displacement of the body from a leveled or stabilized position. Moreover, when the trailer or truck has been parked and the turntable arrangement is in operation, it is highly desirable that the body be disposed horizontally or approximately horizontally.

Accordingly, it has been the primary object of the present inventor to provide a trailer or truck chassis incorporating an improved turntable means for rotatably supporting a body, such as a cab or a sound detection unit.

It has been customary in the past, in providing a rotating mechanism or turntable between a body and a chassis, to include rings on the body and chassis respectively with rollers disposed between the rings. A good example of this is found in the conventional steam shovel chassis and cab combination.

Distortion of the chassis frame due to ground conditions and distortion of the cab within itself tend to warp the respective rings so that the cab will not be maintained in a level position during its rotating movement. It is virtually impossible to machine these rings, after assembly to the chassis or cab, for insuring initial flatness. This is so due to the size of the usual chassis or cab. Even if accomplished it would not necessarily insure the continued requisite level condition due to the above mentioned distortion.

One phase of the present conception has resulted in the provision of a turntable means incorporating a rigid, hollow post attached to either the cab or chassis, and a rigid, tubular member attached to the opposite part and surrounding the post with bearings interposed between the post and member whereby any distortion of the chassis does not affect the smoothness, direction, or speed of rotation of the cab. Thus, direction, speed, and angularity may be accurately measured with instruments associated with the cab. A further advantage of this construction, incorporating a hollow post, has been the ability to pass wiring through the post, or to permit the use of a commutator ring inside the post for electric power transmission.

It has been a further object of the present inventor to provide means for additionally supporting the body toward its outer edges, that is, away from the axis of rotation, which means will be effective for maintaining the body at leveled or stabilized position with respect to the chassis, particularly while the trailer or truck is in motion and which will have the further function of cushioning the body and resisting the tendency to tip through spring devices.

It has been a still further object of the present inventor to provide stabilizing, cushioning, or leveling devices for this purpose which may be conveniently displaced to permit the turntable movement of the body.

It has been a still further object of the present inventor to provide means associated with the chassis of the trailer or truck for adjusting the chassis frame and therefore, the body to horizontal position when the trailer or truck has been parked for operating the turntable.

In the fulfillment of this object, inventor has found it advantageous to provide leveling arms normally lying against the sides of the chassis and which, due to the provision of angularly arranged pivots for the arms, swing downwardly when swung outwardly to positions of use with their outer ends close to the ground.

It has been a still further object to provide an adjustment device for the chassis leveling means so that they can be conveniently moved from their operative positions to carrying positions out of the way against the chassis.

Other objects and certain advantages of the invention will be more fully apparent from the following description of the drawings, in which:

Figure 1 is a side view of a trailer structure, incorporating the turntable mechanism of this invention.

Figure 2 is a top plan view of the structure shown in Figure 1.

Figure 3 is an enlarged fragmentary sectional view, taken on line 3—3, Figure 1, detailing the internal structure of the turntable and the rotating mechanism therefor.

Figure 4 is a top plan view of the turntable element carried by the body which is to be rotated.

Figure 5 is an enlarged fragmentary sectional view illustrating one of the cushioning and stabilizing devices incorporated in the structure.

Figure 6 is a fragmentary sectional view, taken similarly to Figure 5, illustrating a modified form of stabilizing or leveling device.

Figure 7 is a fragmentary sectional view, taken similarly to Figure 5, illustrating a still further modification of the stabilizing and leveling means.

Figure 8 is a view, taken similarly to Figure 5, illustrating a still further modification of the cushioning and stabilizing device.

The purpose of the present apparatus is to permit rotation of a body upon the chassis of a trailer or for use in any installation where it is desired to mount a unit, such as a sound detector unit, in position where it may be quickly and easily rotated when desired. Also, since stabilization or leveling of the trailer body or the unit is important and accordingly the present invention provides means for stabilizing the body while the trailer is being utilized for transporting the body. When it is unnecessary to rotate the body, it may be fully stabilized so as to be maintained in level position with respect to the chassis.

Additionally, when the trailer has been parked and the body or unit is to be rotated, additional devices have been provided which may be adjusted for leveling the chassis itself; that is to say, the trailer in most cases will be resting upon an uneven surface and it is vital that the axis of the turntable be strictly vertical if the turning operations are to be performed easily. Thus, when the normal stabilizing and leveling devices between the body and the trailer are displaced, the trailer may be adjusted to a strictly horizontal position for ease in turning the body.

Referring to the drawings, only so much of the trailer has been detailed as is vital to an understanding of the improved construction forming the present invention. The trailer incorporates front and back trucks indicated generally at 10 and carrying the usual wheels 11. The side rails of the chassis are indicated at 12 and the cross rails at 13. The trailer is pulled by means of an eyelet 14 fixed on the forward end of a draft tongue 15. The tongue 15 consists of side elements 16—16 spread out toward the rear and rotatably mounted on a cross rod 17, fixed in forwardly projected ears 18—18 of the trailer chassis.

The main side rails 12 of the chassis face outwardly. These are fastened against further rail extensions 19—19 forming the rear part of the chassis. Diagonal braces 20 extend in cross relationship between certain of the cross members 13—13. A turntable unit is mounted within the space afforded between two of the cross rails 13—13. An octagonal arrangement of angle iron pieces 22 constitutes the supporting surface for the turntable elements. The horizontal flanges of these angle iron pieces are indicated at 23.

The trunnion for the turntable consists of a heavy element 24 providing an upwardly extended bearing tubular post or sleeve 25 and a horizontally extended base flange 26. The base flange 26 is bolted to the horizontal flanges 23 of the angle pieces 22 by means of bolts 27 extended through apertures in its margin. This sleeve portion of the trunnion element provides the bearing and supporting surface for the upper turntable element 30.

Two combined end and lateral thrust bearings 31—31 are utilized between the sleeve portion 32 of the upper element and the sleeve portion of the lower element. The upper turntable element includes a horizontal base flange 33 extended therefrom at a plane spaced upwardly from the lower end of the sleeve. The truck body is supported upon this upper element. For this purpose a tubular member 34 is provided. The lower outwardly extended flange 35 of this element 34 is secured to the outer margin of the horizontal flange of the upper turntable element by means of bolts 36. The upper outwardly extended horizontal flange 37 of the element 34 is secured to the underside of the floor of the trailer cab 38 by means of bolts 39 and thus, the trailer cab is supported upon the margin of the flange 33. Additionally, I-beams 40 extend radially outwardly from the circular element and constitute further extensions of the support (Figure 1). The floor of the cab includes an opening 38a forming a continuation of the bore of the tubular post. Control wiring (not shown) may be extended up through the opening thus provided, or commutator rings may be used in the bore of the tubular post.

The inner race 41 of the lower bearing is seated against a shoulder 42 of the trunnion sleeve toward the lower end thereof. The outer race 43 of this bearing engages against the shoulder 44 on the inner bore of the sleeve of the upper turntable element. Angularly placed roller bearings are employed. The outer race 45 of the upper bearing rests against the shoulder 46 in the inner bore of the upper turntable element. The inner race 47 of the upper bearing is engaged by means of an adjustable ring 48 screwed on the upper end of the trunnion. Thus, the bearings are clamped in position. This adjustable ring is held in set position by means of a screw 49 traversing a horizontal slit in the ring, clamping the ring upon its threads.

The ring further includes a felt packing ring 50 extending outwardly into sealing contact with the inner surface of the bore of the upper turntable element. Another packing ring 51 is secured in a groove in the outer surface of the trunnion just below the lower bearing and contacts the lower end of the bore of the upper turntable element. Thus, the bearings may be packed with grease through an opening 52 closed by means of a conventional plug.

The means for turning the cab on the turntable consists of a ring gear 53 fastened against the lower flange and surrounding the trunnion sleeve at the base thereof. This ring gear is held in position by means of screws 54. A pinion 55 is fastened to the lower end of a drive shaft 56 and meshes with the ring gear 53. The shaft 56 is journalled in roller bearings 57—57 disposed at the upper and lower ends respectively of a bearing sleeve 58 formed integrally with the horizontal flange of the upper truck. Nuts 59 are screwed upon the upper end of the stub shaft 56 for holding the pinion against a packing ring element 60, which in turn engages the inner race of the lower bearing. The nuts engage a similar packing ring 61 against the inner race of the upper bearing. A drive shaft extension 62 has a splined connection with the upper end of the shaft 56 and is projected downwardly through an aperture 63 in the floor of the cab. Its headed lower end 64 engages over the upper end of the stub shaft.

In order to provide a casing for the gearing, a circumferentially vertical flange 65 projects upwardly from the outer margin of the base flange of the trunnion element. Also, a similar flange 66 projects downwardly from the under surface of the horizontal flange of the upper turntable element within the flange just mentioned. A packing ring 67 is disposed between these flanges. Grease may be supplied to the chamber, thus provided, through filler pipes 68—69, one 68 extending down from the cab floor through the flange of the upper turntable element and the other 69 extending horizontally toward the circumferential vertically disposed flange of the trunnion element. The latter pipe is accessible through an aperture 70 in the channel iron side rail 12 of the chassis.

When the cab 38, or whatever body is supported on the trailer chassis, is being transported, it is vitally necessary that the body be held against tipping or displacement from its normal level position with respect to the chassis. The support afforded around the trunnion is not effective in and of itself to prevent a certain amount of tipping and therefore, a series of devices is employed for completely stabilizing, leveling, or cushioning the cab in level position. The form of device shown throughout the general views is detailed in Figure 5.

The chassis includes lateral or side extensions 71 which project out from the chassis beyond the side lines of the cab body. These extensions may be formed of channel iron members as illustrated. A bracket 72 (Figure 5) is attached to each corner of the cab directly over each of the extensions. This bracket is fixed in place by means of bolts 73 and includes a vertically disposed cylindrical portion 74 open at the bottom and including a closure flange at the top. A cup-shaped pad 75 is fixed to the top of the extension 71 and is engaged by a plunger 76 slidably mounted in the cylindrical portion 74. These pads 75 serve to prevent any rotation of the cab when they are engaged by the plungers 76. An extension 77 projects upwardly from the plunger 76 and extends through the top of the cylindrical portion. The upper end of this extension includes an eyelet 78 traversed by a pin 79 extending between the arms of a bifurcated handle element 80. This element has the edges of its bifurcated portions formed to constitute a cam. A coil spring 81 is disposed under compression between the top of the cylindrical portion and the top of the plunger and about the upward extension.

Thus, when the handle is in the position shown in Figure 5, the plunger 76 is held in engagement with the pad 75 on the extension under spring pressure. When it is desired to raise the contact clear of the extension, the handle is swung upwardly and the camming action causes axial movement of the plunger, thus lifting the contact element from the extension and permitting swinging movement of the body on the turntable.

It will readily be seen that this device is not only effective for leveling the cab, but for stabilizing and cushioning it as well. The tendency for the cab to rock on the trunnion is absorbed in these devices which tend to return it to normal level position and to maintain it there.

Several other forms of devices may be used. The one shown in Figure 6 consists merely of a screw 82 disposed vertically through the horizontal flange 83 of a bracket 84 fixed to the side of the cab. The lower end of the screw engages the cup-shaped pad 75. The contact is displaced by turning the screw. Quite obviously, the cushioning function is not present in this particular form.

In the form shown in Figure 7, a cam disc 85 is mounted on the side of the cab upon a pin 86 extended eccentrically through the disc. This disc has its periphery in contact with the groove of a pad 87 secured upon the top of the extension. This pad is grooved to receive the disc so as to have the effect of preventing any rotation of the cab when the eccentric disc has been rotated to stabilizing or leveling position as indicated in the view.

In Figure 8, a screw of the type shown in Figure 6 is utilized, but the cushioning feature is added. The extension includes a vertical bore 88 in its top side in which is fastened a cylindrical element 89. The bottom of this cylindrical element is closed and a coil spring 90 is disposed under compression between the bottom and a disc 91 engaged by the lower end of the screw as the screw enters the cylindrical element coaxially from above. Thus, the screw may be tightened down sufficiently to stabilize and level the cab and to place the spring under some compression. Thereupon, this device will function in the same manner as that shown in Figure 5. The devices, described heretofore, are used, as stated, when the body is being transported, and are adjusted to suit conditions.

After the trailer has been parked and the turntable structure is to be utilized, structure has been provided for leveling the trailer itself. Quite obviously, the trailer will, in practically all cases, rest unevenly and this would prove a serious handicap to easy and efficient turntable action. Accordingly, three of these leveling devices are provided, one at the rear of the chassis and one at each side thereof toward the front.

The one at the rear consists of a screw 92 threaded through a bracket 93 fixed to the rear cross rail 94 of the chassis. This screw is disposed on a vertical axis and carries a contact pad 95 at its lower end and a rotating handle wheel 96 at its upper end. A block (not shown) may be placed between the pad and the ground and the screw may be adjusted accordingly.

The devices toward the front of the chassis, in each instance, consist of an arm 97 extending outwardly from the side rail of the chassis. Each arm is pivotally mounted on the side rail of the chassis between upper and lower lugs 98 thereof. A pin 99 extends through these lugs and the bore in the adjacent end of the arm. This pin, as shown in Figure 3, inclines from a vertical plane so as to direct the arm more toward the ground. The outer end of the arm includes a lug 100 through which an adjustment screw 101, similar to that at the back of the trailer, is threaded. A link 102 extends between an ear 103 on the lug and a bolt 104 disposed vertically through the upper and lower flanges of the side rail 12 of the chassis.

When the operator wishes to use these adjustment devices they are swung out, as shown in Figure 2 at the lower side of the view, and the bolt 104 is placed in the forward one 105 of its two apertures. When not in use, the bolt is withdrawn and the link is pulled back so as to be traversed by the bolt when the bolt is placed in the rear aperture 106. This draws the arm close in to the side of the chassis and out of the way. As shown, it will be disposed beneath the cab when drawn back out of service. Thus, by manipulating these devices, the operator may, with the use of blocks, completely level the trailer chassis and place the axis of the trunnion in a strictly vertical plane.

Having described my invention, I claim:

1. In a chassis for a trailer having a body, a trunnion mounted on the chassis, a support element carried by the body and adapted to be turned, said support element including a sleeve engaged upon the trunnion, bearing means between the trunnion and sleeve, said trunnion element including a base portion for attachment to the chassis and an upstanding circular flange, said support element including an annular flange spaced below the body and having a circular depending flange disposed adjacent to the circular flange of the trunnion element, sealing means between said flanges, a circular wall member extending upwardly from the annular flange for a connection at its upper end with the body, a gear fixed about the trunnion within the chamber provided by the flanges, a pinion disposed within the chamber in mesh with said gear, and a drive shaft projecting down through the body into the chamber and carrying said pinion.

2. A chassis adapted to rotatably support a body, a turntable mechanism on the chassis, devices on the body adjacent each corner thereof for engagement with the chassis for stabilizing and leveling the body, each of said devices including a tubular element attached to the body, a contact element slidably mounted in the tubular element and adapted to engage the chassis, an extension on said contact element extending upward through the tubular element, said tubular element having a closed top, a spring between the contact element and said top, and a cam member pivotally attached to the extension and engaging the top and including a handle whereby the contact element may be raised for displacing it for contact with the chassis.

3. In a chassis for a trailer or the like, means for rotatably supporting a body thereon, adjustable contact means carried by the chassis at a plurality of points, brackets supporting said adjustable means, whereby engagement of said means against the ground or interposed blocks will level the chassis to horizontal position, pivot means for supporting certain of said brackets, the axis of said pivot means being inclined outwardly whereby said brackets will be swung downwardly as they are swung outwardly, and brace elements adapted to hold said certain brackets in outwardly extended position for use, but displaceable to permit swinging of the brackets against the chassis and out of the way.

4. In a trailer, a wheeled chassis adapted to support a turntable mechanism, an adjustment device at the rear of the trailer including a contact member adapted to contact the ground or an interposed block, a bracket adjustably supporting said contact member, brackets pivotally mounted on the sides of said chassis, contact members adjustably mounted in the outer ends of these brackets and adapted to engage the ground or interposed blocks, means for pivotally mounting said brackets on the sides of the chassis, braces pivotally connected to the outer ends of the brackets, removable means for connecting the inner ends of the braces to the chassis, and means in the sides of the chassis permitting removal of said latter means from positions holding the brackets in extended position and permitting the placement of the means in positions holding the brackets in positions against the sides of the chassis.

5. In a chassis structure including a frame and wheels, means for leveling said frame relative to the ground comprising arms; pivots mounting said arms on the sides of the frame, the axis of said pivots leaning outwardly from said chassis frame and means on the outer ends of the arms adapted to contact the ground, said pivots being effective for causing the outer ends of the arms to swing downwardly when the arms are swung outwardly.

6. In a chassis for a trailer or the like, a trunnion mounted on said chassis, said trunnion including a base plate, a post extending upwardly from the base plate and an upstanding flange spaced annularly from the post, a support element carried by the body and adapted to be turned, said support element including a sleeve surrounding said post and a lateral flange spaced below the top of said post having a depending skirt disposed adjacent the annular flange of said trunnion, bearing means interposed between said sleeve and post, sealing means interposed between the said upstanding flange and skirt, an annular wall extending upwardly from said lateral flange and arranged to be connected with said body at its upper end, a gear fixed on said post, a pinion meshed with said gear and spaced inwardly from said upstanding flange and a drive shaft projecting down through the body, within said annular wall and carrying said pinion.

JAMES J. BLACK.